United States Patent
Diaz et al.

(10) Patent No.: US 10,352,711 B2
(45) Date of Patent: Jul. 16, 2019

(54) COMPUTER-IMPLEMENTED METHOD AND A SYSTEM FOR GUIDING A VEHICLE WITHIN A SCENARIO WITH OBSTACLES

(71) Applicant: The Boeing Company, Chicago, IL (US)

(72) Inventors: Lucas Rodriguez Diaz, Seville (ES); Carlos Querejeta, Madrid (ES); Ernesto Valls Hernández, Madrid (ES)

(73) Assignee: The Boeing Company, Chicago, IL (US)

( * ) Notice: Subject to any disclaimer, the term of this patent is extended or adjusted under 35 U.S.C. 154(b) by 64 days.

(21) Appl. No.: 15/686,974

(22) Filed: Aug. 25, 2017

(65) Prior Publication Data

US 2018/0100743 A1 Apr. 12, 2018

(30) Foreign Application Priority Data

Oct. 6, 2016 (EP) .................................. 16382458

(51) Int. Cl.
 *G01C 21/34* (2006.01)
 *B64C 39/02* (2006.01)
 (Continued)

(52) U.S. Cl.
 CPC ........ *G01C 21/3415* (2013.01); *B64C 39/024* (2013.01); *G01C 21/20* (2013.01);
 (Continued)

(58) Field of Classification Search
 CPC ............................ G01C 21/3415; G01C 21/20; G01C 21/3446; G01C 21/3469; B64C 39/024;
 (Continued)

(56) References Cited

U.S. PATENT DOCUMENTS

| 7,228,232 B2 | 6/2007 | Bodin et al. |
| 8,768,555 B2 | 7/2014 | Duggan et al. |
| (Continued) | | |

FOREIGN PATENT DOCUMENTS

| EP | 2428771 A1 | 3/2012 |
| EP | 3118578 | 7/2015 |
| EP | 2428771 B1 | 1/2016 |

OTHER PUBLICATIONS

EP2428771A1, Thales translation, Mar. 2012.*
(Continued)

*Primary Examiner* — Anne M Antonucci
*Assistant Examiner* — Renee LaRose
(74) *Attorney, Agent, or Firm* — McDonnell Boehnen Hulbert & Berghoff LLP

(57) ABSTRACT

A method and a system for guiding a vehicle from a source to a target within a scenario with obstacles are disclosed. The source is established as a starting point and a subpath to the target is computed. When an obstacle is detected that crosses the computed subpath, a plurality of obstacle-free subpaths are computed to connect the starting point to a waypoint of an outer boundary of a detected obstacle. Priorities for each waypoint are computed and ordered accordingly in a list of potential waypoints to select the highest priority waypoint in the list as a new starting point. Previous operations are repeated until the target is reached, thus the path is obtained by backtracking waypoints to the source. The vehicle can be then guided and the target reached via the obtained path.

20 Claims, 6 Drawing Sheets

(51) Int. Cl.
*G01C 21/20* (2006.01)
*G05D 1/02* (2006.01)
*G05D 1/00* (2006.01)

(52) U.S. Cl.
CPC ..... *G01C 21/3446* (2013.01); *G01C 21/3469* (2013.01); *G05D 1/0202* (2013.01); *G05D 1/0212* (2013.01); *G05D 1/0217* (2013.01); *B64C 2201/141* (2013.01); *G05D 1/0088* (2013.01)

(58) Field of Classification Search
CPC ... G05D 1/0202; G05D 1/0212; G05D 1/0217
See application file for complete search history.

(56) References Cited

U.S. PATENT DOCUMENTS

2005/0192749 A1  9/2005  Flann et al.
2007/0093945 A1* 4/2007  Grzywna ............... G05D 1/101
                                         701/23

OTHER PUBLICATIONS

Max Welling: "A* Search", Jan. 28, 2012 (Jan. 28, 2012), XP055354439, Retrieved from the Internet: URL:https://web.archive.org/web/20120128222739/http://www.ics.uci.edu/-welling/teaching/ICS175winter12/AstarSearch.pdf [retrieved on Mar. 14, 2017].

Daniel Delling et al., "Engineering Route Planning Algorithms", Algorithmics, LNCS 5515, 2009, p. 117-139.

Gamasutra: Matt Klingensmith's Blog—Overview of Motion Planning, retrieved from: http://www.gamasutra.com/blogs/MattKlingensmith/20130907/199787/Overview_of_Motion_Planning.php on Aug. 23, 2017.

Mark de Berg et al., "Computational Geometry, Visibility Graphs". Algorithms and Applications, 3rd Ed., BSpringer Berlin Heidelberg, 2000, pp. 307-317.

Yun-Hui Liu et al., "Proposal of tangent graph and extended tangent graph for path planning of mobile robots," Proceedings of the 1991 IEEE International Conference on Robotics and Automation, Apr. 1991, pp. 312-317.

H. Kaluder et al., "A visibility graph based method for path planning in dynamic environments," in MIPRO, 2011 Proceedings of the 34th International Convention, May 23-27, 2011, pp. 717-721.

Tran Thi Nhu Nguyet et al., "Some Advanced Techniques in Reducing Time for Path Planning Based on Visibility Graph," 2011 Third International Conference on Knowledge and Systems Engineering, Oct. 14-17, 2011, pp. 190-194.

David Wooden et al., "Oriented visibility graphs: low-complexity planning in real-time environments," Proceedings of the 2006 IEEE Conference on Robotics and Automation, May 15-19, 2006, pp. 2354-2359.

Leena Lulu et al., "A comparative study between visibility-based roadmap path planning algorithms," 2005 IEEEIRS/RJS International Conference on Intelligent Robots and Systems, Aug. 2-6, 2005, pp. 3253-3268.

Subir Kumar Ghosh et al., "An output-sensitive algorithm for computing visibility graphs". SIAM J. Comput. vol. 20, No. 5, Oct. 1991, 1991 Society for Industrial and Applied Mathematics, pp. 888-910.

Kwangjin Yang et al., "An Efficient Path Planning and Control Algorithm for RUAV's in Unknown and Cluttered Environments", J Intell Robot Systems (2010) 57:101-122. DOI 10.1007/s10846-009-9359-1, pp. 101-122.

Avijit Sarkar et al., "Finding rectilinear least cost paths in the presence of convex polygonal congested regions", Computers & Operations Research 36 (2009), pp. 737-754.

Lian Liu et al., "Finding shortest path on Land Surface" SIGMOD '11, Jun. 12-16, 2011, Athens, Greece.

Yao-hong Qu et al., "Flight Path Planning of UAV Based on Heuristically Search and Genetic Algorithms", (IECON 2005, 31st Conference of IEEE), Nov. 6-10, 2005, Northwestern Polytechnical University.

S.G. Henderson et al., "Simulation-Aided Path Planning of UAV", Proceeding of the 2007 Winter Simulation Conference, pp. 1306-1314.

Vivek Yadav et al., "Neural Network Approach for Obstacle Avoidance in 3-D Environments for UAVs", Proceeding of the 2006 American Control Conference Minneapolis, Minnesota, USA, Jun. 14-16, 2006.

Avrim Blum et al., "Navigation in Unfamiliar Geometric Terrain". Siam J. Comput., vol. 26, No. 1, Feb. 1997, pp. 110-137.

Jongre Kim et al., "Discrete Approximations to Continuous Shortest-Path: Application to Minumum-Risk Path Planning for Groups of UAVs", Proceedings of the 42nd IEEE Conference on Decision and Control Maui, Hawaii USA, Dec. 2003, pp. 1-19.

Patrick Vincent et al., "A Framework and Analysis for Cooperative Search Using UAV Swarms", 2004 ACM Symposium on Applied Computing, Mar. 14-17, 2004, pp. 79-86.

Tugcem Oral et al., "A Multi-Objective Incremental Path Planning Algorithm for Mobile Agents", 2012 IEEE/WIC/ACM International Conferences on Web Intelligence and Intelligent Agent Technology, pp. 401-408.

Office Action issued the European Patent Office in application serial No. 16 382 458.4, dated Apr. 7, 2017.

* cited by examiner

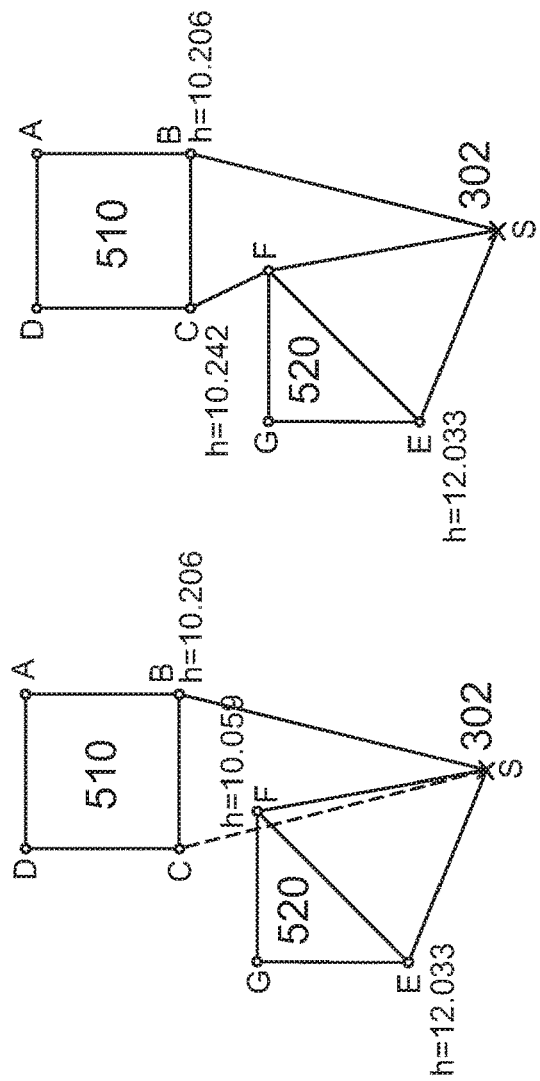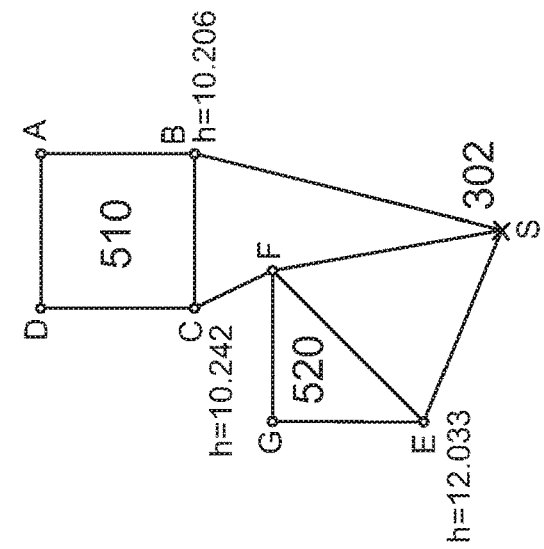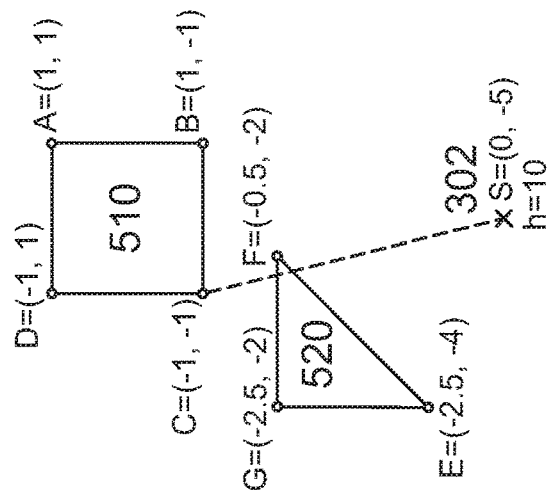

COMPUTER-IMPLEMENTED METHOD AND A SYSTEM FOR GUIDING A VEHICLE WITHIN A SCENARIO WITH OBSTACLES

CROSS REFERENCE TO RELATED APPLICATION

The present application claims priority to EP application number 16382458.4, filed on Oct. 6, 2016, the entire contents of which are herein incorporated by reference.

FIELD

The present disclosure generally teaches techniques related to path finding in static and dynamic environments. In particular, the teachings further relate planning and real-time guidance applications, including those of unmanned aerial vehicles (UAVs), ground robots and other moving autonomous vehicles.

BACKGROUND

A moving autonomous vehicle typically includes some type of sensor system for gathering information of an environment through which the vehicle navigates. A problem associated with guiding a vehicle is the large amount of computing power required to analyze the scenario in order to identify obstacles and to avoid them in a reliable manner while finding a valid path to a target or destination. The interpretation of data is normally too slow to be useful within a scenario with obstacles in real-time applications.

In general, the term path finding relates to a collection of techniques for finding an optimal (e.g. safest, shortest, etc.) route between two points, namely a source and a target, within a scenario within obstacles. A visibility graph is a roadmap, a route that stores the visibility relationships between a set of objects, considering as obstacles normally defined by polygons. The visibility graph is basically made up of visible nodes and weighted edges. Visible nodes represent safe potential waypoints that are mutually connected by edges. Each edge carries a weight defined by a cost function, which is usually the Euclidean distance between the nodes. The joint of different edges provides a subpath. Thus a subpath defines a way of reaching a waypoint from another waypoint. An optimal path may comprise several subpaths. The creation of a visibility graph is a complex task that usually requires high computational times to provide a feasible response.

Normally visibility-based path finding approaches represent obstacles by geometric figures (e.g. polygons, circles, etc.) since there are no performance losses related to discretization. There are improvements in sophisticated algorithms that make certain simplifications to build a graph, providing, in particular cases, good performance from the computational complexity point of view (e.g. N log N). Yet they consider all the polygons vertices of the scenario as potential waypoints. In addition, they are complex and unintuitive to implement.

In sum, existing approaches build a full graph regardless of the importance of the information of different areas with respect to a source (e.g. the current position) and a target position. As a consequence, they are extremely inefficient in real-time applications and complex environments.

For this reason, known solutions cannot be applied in practice, when obstacles on the travel path are found and quick evasive maneuvers are required. An efficient generation under real-time constraints of a path that is free of obstacles is therefore needed.

SUMMARY

As mentioned, the construction of traditional visibility graphs is inefficient for moderately intricate scenarios. To overcome or at least mitigate some of the existing limitations, the disclosed teachings provide new techniques to carry out fewer checks.

In particular, the present disclosure is aimed at a computer-implemented method and a system for an efficient identification of a valid path based on a distinct construction of visibility graphs with an efficient filtering of information. Preferably a geometrical (e.g. polygonal) description of the environment is used to increase the accuracy of the resulting path and to improve robustness and efficiency in contrast with existing grid-based proposals. Pruning strategies are proposed to allow filtering out non-essential information usually provided in real-world operational environments and to prioritize a list of candidate waypoints to reach the target.

As a consequence, a significant reduction of unnecessary waypoints and subpaths can be achieved while such reduction advantageously does not influence the result. Thus, the obtained solution is guaranteed to contain the optimal path that avoids the obstacles.

In this regard, the concept of obstacle should be construed in a broad sense. For instance, a no-incursion zone like a restricted area should be considered an obstacle. Clearly, a physical object is considered an obstacle as well. The present disclosure also uses the common tangent concept of a geometrical figure, normally a polygon. It is to be understood that a common tangent is a line touching the geometrical figure such that the whole figure lies to the same side of the line. In case of polygons, finding common tangents can be viewed as finding extreme vertices of the polygon. Such representation may simplify implementation.

In general terms, the present disclosure is a computer-implemented method for guiding a vehicle from a source to a target within a scenario with obstacles. In order to find a valid path around obstacles, the method firstly establishes the source as a starting point and computes a subpath from the starting point to the target. It detects when an obstacle crosses the computed subpath and repeatedly, for a detected obstacle, this obstacle that must be avoided, being the first encountered when traversing the subpath, the method computes a plurality of obstacle-free subpaths avoiding the detected obstacle, each obstacle-free subpath connecting the starting point to a waypoint of an outer boundary of a detected obstacle. The method further computes a priority value for each waypoint, wherein the priority value is computed based on the distance between the waypoint and the target, assuming there are no obstacles, and the accumulated distance from the source to the waypoint. The accumulated distance is a sum of distances of obstacle-free subpaths connecting the source to the waypoint. Such distance is defined according to a pre-established metric. The method also stores each waypoint and its corresponding priority in a list of potential waypoints (LPW) and then it selects the highest priority waypoint in the list as a new starting point for the next iteration. This is repeated until the target is reached. After this step, a valid path is obtained by backtracking waypoints from the target to the source. Lastly, the method guides the vehicle according to the obtained path avoiding obstacles. This path is also optimal according to the metric.

In order to build the list, a priority value is associated to a waypoint, the priority of a given waypoint is based on a distance defined according to a pre-established metric. The priority of a waypoint is computed as the distance between that waypoint and the target (regardless eventual obstacles) and the accumulated distance from the source to said waypoint.

The accumulated distance from the source to a waypoint may include at least the distance associated to the obstacle-free subpath with its ending point being the waypoint. In case of the source and the waypoint be connected through several obstacle-free subpaths, the accumulated distance also includes preceding obstacle-free subpaths.

In accordance with the present disclosure, the computer-implemented method for guiding a vehicle may be coded as a program product to be executed by a processor.

In accordance with the present disclosure, there is also provided a system for guiding a vehicle from a source to a target within a scenario with obstacles. The system includes a path computing unit that establishes the source as a starting point and computes a subpath from the starting point to the target. The system also includes a detecting unit that detects if an obstacle crosses a computed subpath. Then, the path computing unit repeatedly computes a plurality of obstacle-free subpaths avoiding a detected obstacle. Each obstacle-free subpath connects the starting point to a waypoint of an outer boundary of an obstacle detected in a computed path. The system further includes a selecting unit that computes a priority value for each waypoint, it also stores each waypoint and its corresponding priority in a LPW and then selects the highest priority waypoint in the LPW as a starting point. The system repeats the previous actions until the target is reached. The path computing unit obtains a valid path by backtracking waypoints from the target to the source. A path a guiding unit also included in the system safely guides the vehicle according to the valid path. This path is also optimal according to the metric.

The detecting may include ultrasonic detectors, mechanical contact devices, laser ranging apparatus or a camera and an image processor. It may gather environment information from a Geographic Information System (GIS) or from a No Incursion Zones (NIZs) provider in order to detect obstacles.

Advantageous developments of the method and system are as follows.

BRIEF DESCRIPTION OF THE DRAWINGS

A series of drawings which aid in better understanding the disclosure and which are presented as non-limiting examples and are very briefly described below.

FIGS. 5A, 5B, 5C, 5D, 5E and 5F depict several stages of the operation within a two-obstacle scenario.

DETAILED DESCRIPTION

Various embodiments illustrate the efficient creation of a valid path in scenarios within several obstacles (O) that can be used in a vehicle to navigate and move autonomously.

Importantly, the application of these teachings is not limited to the particulars set forth in the following detailed description or drawings.

To avoid unnecessarily obscuring the understanding of these teachings, polygons are selected herein as the geometric representation to model obstacles boundaries.

A list of potential waypoints (LPW) stores the polygons vertices (nodes) that are traversed to build a valid path with several subpaths. The LPW is a data storage device to be used as a dynamic container that is continuously updated. In an initialization step, the LPW has a single waypoint (W) which coincides with the source (S). An advantageous selection of the next waypoint to visit based on a heuristic (Directed Search) is devised. A graph is consistently expanded with feasible and optimal sub-paths, thus reducing the trial-and-error iterative process and ensuring optimality.

The heuristic used as a decision-making identifies the most promising waypoint to build an optimal path with several subpaths according to a pre-established metric. The metric defines a distance to measure the cost of traversed subpaths. This distance is normally the Euclidean distance, however other metrics may be used like Geodesic distance, less fuel consumption distance, less altitude distance, etc. The metric to be used depends on the application. At any event, the heuristic is guaranteed never to overestimate the actual cost of the source-waypoint-target path because the actual distance can either be the length of the source-waypoint-target path or greater if there is an eventual obstacle between the waypoint and the target. This circumstance can be seen in some of the figures.

When a potential waypoint from the LPW is obtained, the graph is expanded through the branch (i.e. connected sub-paths) that looks the most promising. Remarkably using the heurist does not necessarily imply the right node is going to be expanded, but in the worst-case scenario all nodes would eventually be expanded. In other words, the application of this heuristic does not discard any waypoints but prioritizes them.

Remarkably, the path finding can be stopped whenever the target is reached for the first time. All the waypoints that remain as candidates in the LPW are guaranteed to have a greater cost, even if a straight path from them to the target is collision free. Therefore, the resulting graph size is normally much smaller, which reduces computational time and also possibly reduces memory and CPU usage, especially in large scenarios.

Figure 1:
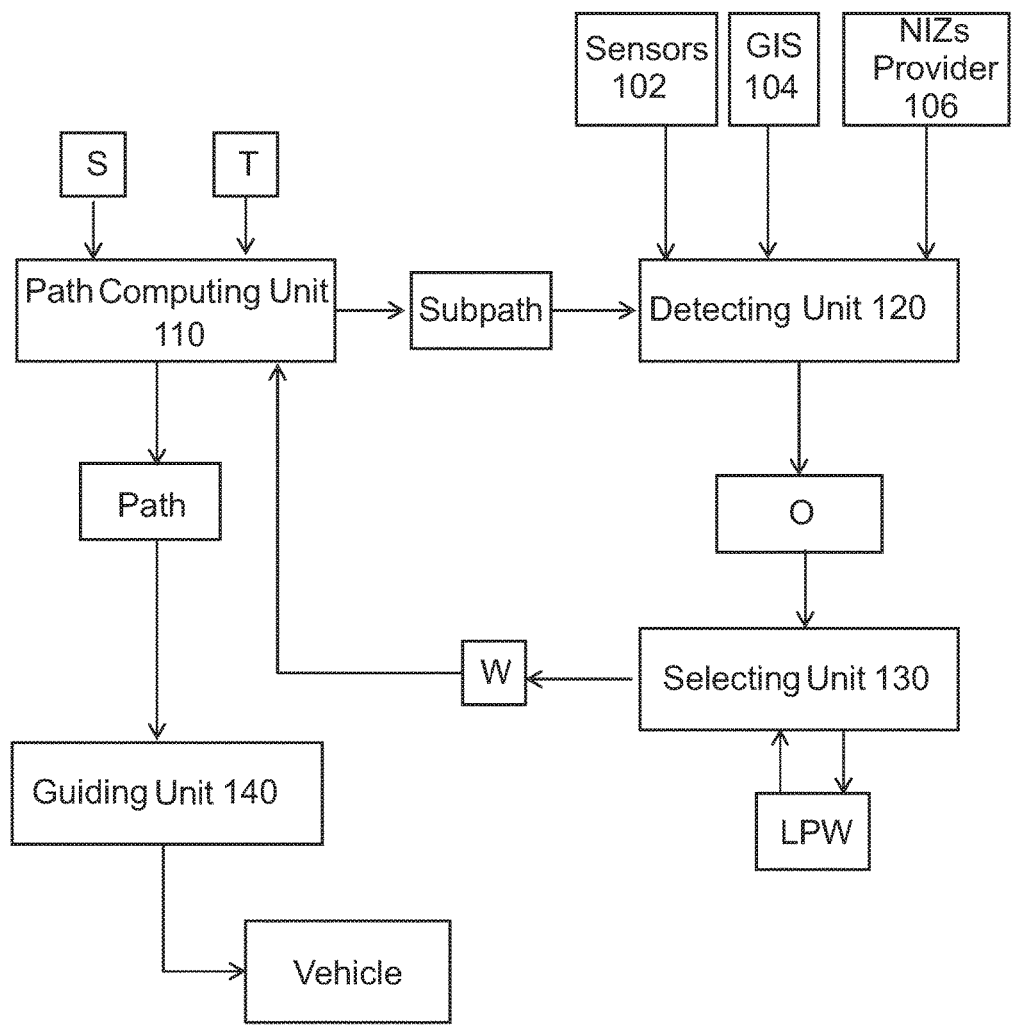
FIG. 1 is a high-level block diagram of the disclosed teachings.

FIG. 1 is an exemplary and non-limiting description of a block diagram of a system on which the present disclosure can be implemented, in particular in a UAV or in a ground robot.

A No-Incursion Zones (NIZs) Provider module 106 stores no-flight zone polygons. This information may also be obtained from different sources. For instance, in a tactical scenario, a vehicle might have onboard sensors 102 to detect obstacles (O). In this case, the NIZs Provider module 106 gets information from such sensors 102 and defines a NIZ that represents the obstacle. In more strategic scenarios, the source to get information can be either a Geographic Information system (GIS) 104 or a map where, for instance, cities' boundaries can be identified by the NIZs Provider module 106 and then, modeled. In the present example, NIZs are modeled by polygons, however, any other geometric figure might be used to represent other real hazards. For instance, the uncertainty of the position of an obstacle (O) that represent a NIZ might be modeled by a circle or an ellipsoid.

A user or a Navigation system establishes the source (S) and target (T) which are provided to the path computing unit 110. For instance, the user wants to identify the shortest path between the source (S) and the target (T). In other cases, a Navigation system of a vehicle provides the current position of the vehicle that will be used as the source (S).

A path computing unit 110 is in charge of calculating a metric distance. In the present embodiment, distance calculations are based on the Euclidean distance but in other implementations might be calculated based on other figure of merits (e.g. fuel consumption, less altitude, etc.). In addition, the path computing unit 110 cooperates with a selecting unit 130 in charge of keeping updated a storage medium wherein information regarding a list of potential waypoints (LPW) that may be checked is stored. In order to do so, a two way communication with the selecting unit 130 is established.

The selecting unit 130 carries out the expansion of the graph based on the distance calculations. It defines the segments (subpaths) between waypoints and calculates their intersection with the polygons. Finally, the selecting unit 130 stores information of the calculated subpath and provides an optimal path by means of a list of waypoints to a guiding unit 140. This unit 140 may control the vehicle to safely reach the target (T).

Figure 2:
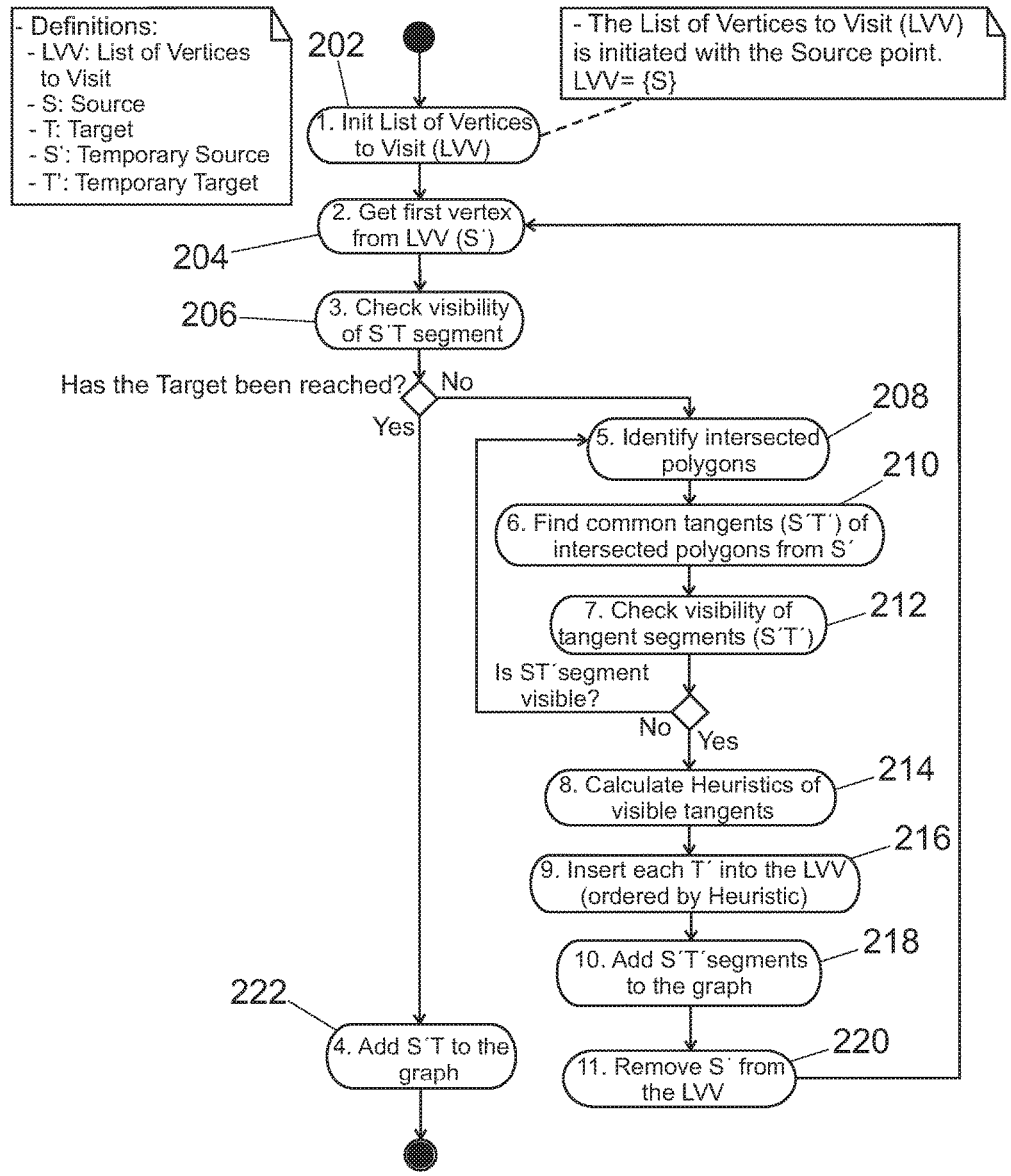
FIG. 2 schematically shows a flow diagram describing operations for seeking a route avoiding obstacles.

FIG. 2 shows a flow diagram according to the heuristic for seeking a route to avoid obstacles represented by polygons. The main steps are explained bellow:

1. The algorithm starts with an initialization step 202 for initializing a list of potential waypoints (LPW).

2. A getting step 204 gets a first waypoint (a vertex of a polygon) from LPW. The most promising waypoint according to the metric—called S'—is identified from the LPW in order to expand the graph. By construction, such waypoint is always located at the first position of the list.

3. A segment visibility check step 206, where S'T segment is checked to be free of obstacles (polygons). S' is the waypoint that is being expanded and T is the target waypoint. Then, the subpath defined as the segment S'T is intersected with all the polygons. If the segment S'T is not obstacle-free, the algorithm jumps to step 208.

4. Adding subpath step 222, where subpath S'T is added to the graph provided it does not cross any obstacle, that is to say the segment S'T is visible. When this step is reached, the heuristic (see metric calculation step 214) assures that solving the current graph will provide the problem's optimal solution without further expansion.

5. Identifying obstacles step 208. This is an efficiency-related step that reduces the complexity by selecting and only paying attention to those obstacles that are obstructing a segment's visibility. Thus, the algorithm is able to filter the obstacles whose inclusion is not necessary as discussed in FIG. 3.

6. Calculating common tangent segment step 210. Common tangent (S'W) of intersected polygons from S' are determined. Instead of building a full visibility graph, obstacles are avoided by finding the common tangents between S' and the intersected polygons.

7. Common tangent segment visibility check step 212, where visibility of tangent segments (S'W) is determined. W represents any of the endpoints of the tangent segments. If a tangent segment is visible, the flow diagram can continue through step 214. If, however, a tangent segment S'W crosses any obstacle, the heuristic cannot add that segment to the graph and identifies the obstacles that are involved in that intersection by jumping to step 208.

8. Priority calculation step 214. Once this step has been reached, a set of visible segments are found which are tangent to those polygons involved in the conflict. The heuristic uses a criterion to order the LPW in such a way that traversing the graph is more efficient than doing it following an arbitrary order.

Taking as input the ending points of the visible tangent segments (potential waypoints W), the minimum cost is calculated (e.g. in Euclidean distance) that visiting each waypoint could have.

9. Including endpoints step 216, where each waypoint W is included in the LPW (ordered according to its corresponding priority). The priority calculation is based on the S'WT lengths, the corresponding waypoints (W) are inserted in the LPW by comparing their associated priorities with those that were previously added to the list. Thus, the LPW contains the list of all the potential waypoints ordered according to the distance S'WT. The heuristic is guaranteed never to overestimate the actual cost of the S'WT path because the actual distance can either be the length of the S'WT path or greater, if there is an obstacle between waypoint W and target T. In the worst-case scenario all nodes would eventually be expanded whereas, in other cases, the expansion can be significantly reduced.

When the method gets a node to visit from the LPW (step 202), the graph is expanded through the branch that looks the most promising.

Using the heuristic criterion does not necessarily imply the right node is going to be expanded. In other words, using the heuristic does not discard any waypoints; it merely prioritizes them.

As a result of employing this heuristic, the graph building can be stopped whenever the target is reached for the first time. All the nodes that remain in the LPW are guaranteed to have a greater cost (distance) even if a straight path from them to the target was collision free. Therefore, the resulting graph size is much smaller, which saves both computer memory and processing requirements, especially in large scenarios. The example in FIG. 3 shows how the heuristic works with an example of a static scenario.

10. In the adding step 218, S'W segments are added to the graph. All S'W are now collision-free and can be included to the graph. However, the algorithm checks if W has been reached before through a shorter path, in which case that S'W segment is not added to the graph, reducing the graph's complexity. The same applies to the insertion of points in the LPW.

11. Removing step 220, where S' is removed from the LPW. Having expanded the graph from node S', the node is removed from the list. For the next iteration, the LPW will contain the vertices to visit that have progressively emerged from S'.

Figure 3:
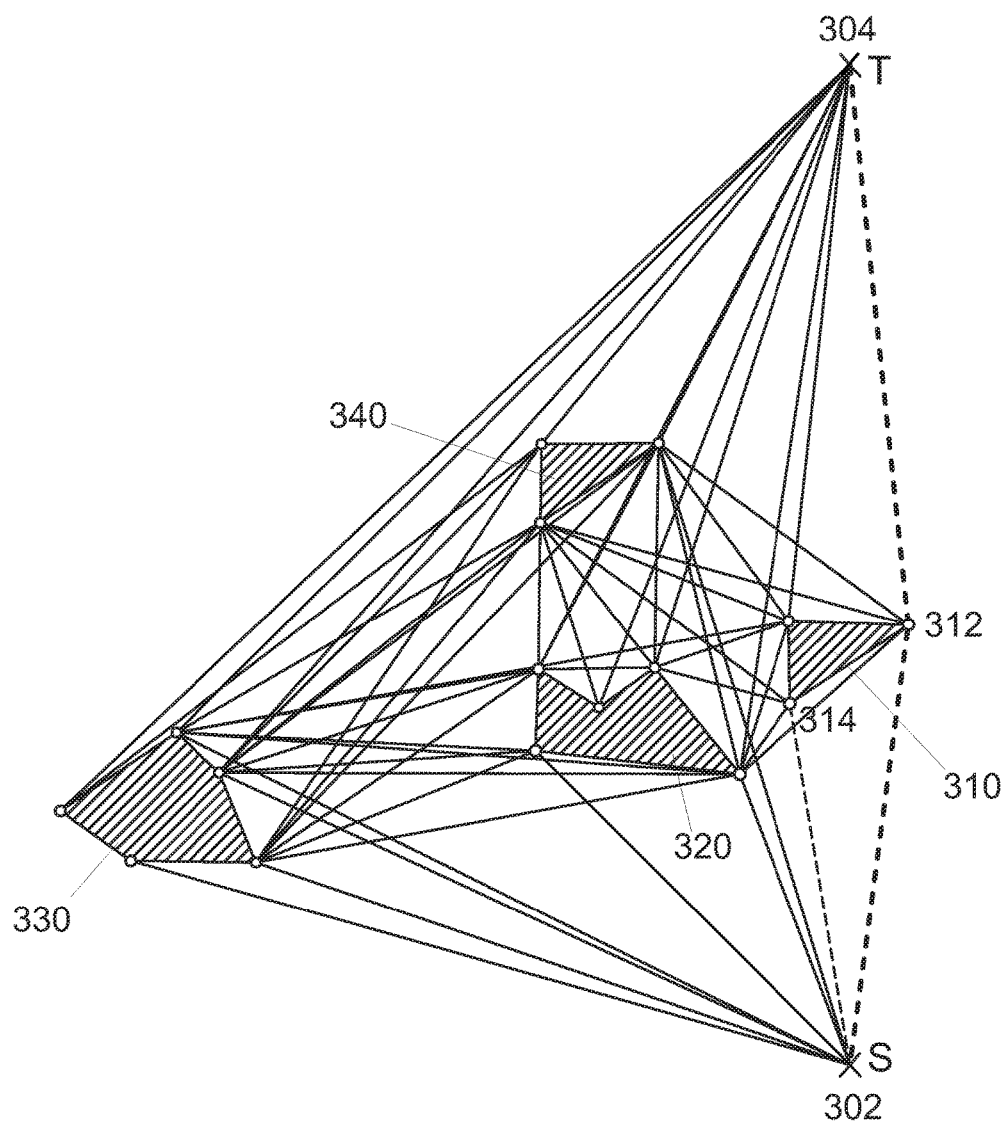
FIG. 3 shows a comparison of different algorithms to generate subpaths.

FIG. 3 shows an example of the complexity reduction. The dotted line is representative of how the target is reached according to the present teachings ignoring three obstacles 320, 330, 340 and only keeps one of them, namely obstacle 310 thus speeding up the finding of the optimal (shortest) path. In this specific scenario, there are 18 potential waypoints (16 vertices of polygons plus source and target). A naive visibility graph algorithm would have generated a complete graph—represented as black segments—with 18 nodes and 71 edges (subpaths), whereas the present approach is able to obtain the shortest path with 4 nodes and 3 edges, shown in dotted line. The thicker dotted segments show connected subpaths that form a valid path from S 302 to T 304.

Figure 4:
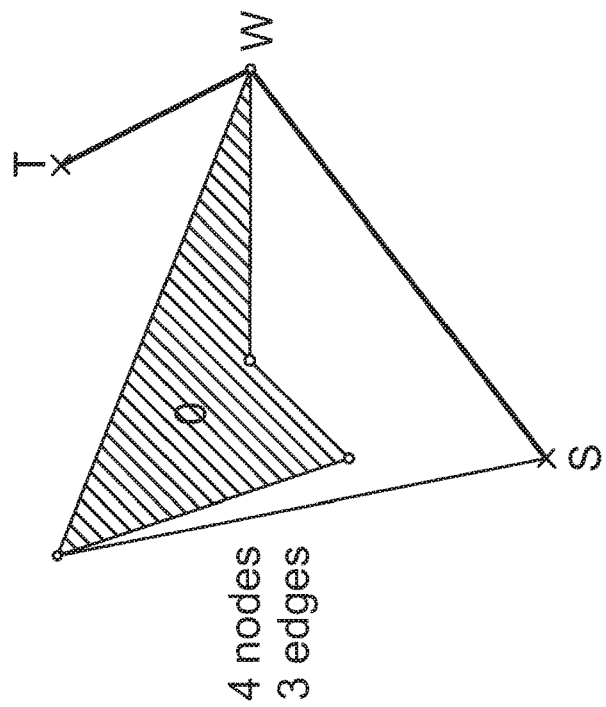
FIG. 4 shows a further comparison for generating common tangents as subpaths for avoidance of non convex obstacle.
Figure 4:
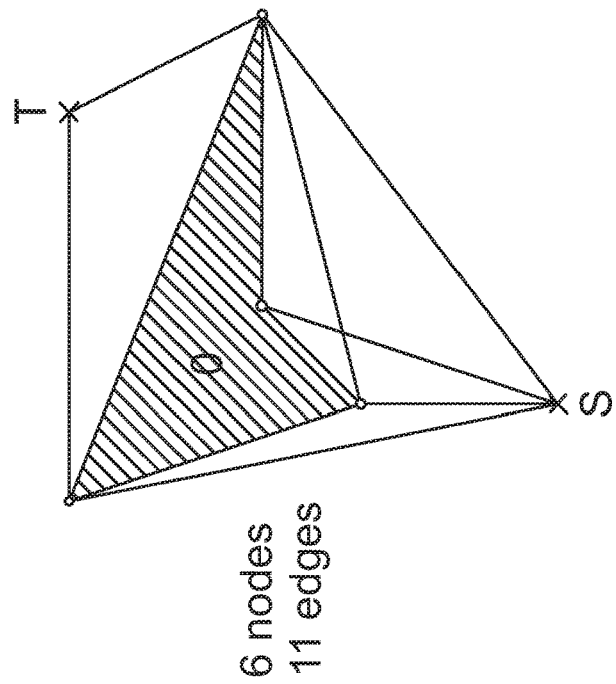

FIG. 4 shows how using common tangents helps reduce the graph dramatically even for a single obstacle O modelled as a polygon. A significant reduction in the size of the graph leads to lower computation times. Note that the polygon's non-convexity doesn't affect the algorithm because the shortest path between source S and target T is proved to consist of common tangent segments. The thicker segments show the valid (e.g. shortest) path to reach T from S.

Reference is now made to FIGS. 5A to 5F, where a simple scenario is presented including some numerical values for a better appreciation of how the present teachings help to efficiently find the optimal path.

The scenario basically includes a source S and target T and two obstacles (O) modelled as polygons, a quadrilateral 510 with vertices ABCD and a triangle 520 with vertices EFG.

To find a conflict-free shortest path amidst the polygons to reach the target T from the source S, the distance between S and T is calculated, which in this case is 10 m (from (0,−5) to (0,5)). Such distance along with the S starting point initialize the list of potential waypoints (LPW); so that the LPW initially contains the pair: ([10, S]).

Once the LPW has been initiated, the graph is expanded from the first point in LPW (in this case, the S point. This task is illustrated in FIGS. 5A and 5B. The graph expansion is as follows:
i) The ST segment is defined and a detection of whether ST crosses any polygon is carried out. In this case, the ST segment collides with the obstacle 510 so that the square is the first polygon to avoid.
ii) In order to avoid a polygon, the two common tangent segments of the detected polygon are calculated: SC and SB tangent segments are obtained.
iii) In an iterative manner, it is checked whether such common tangent segments cross any other polygon within the scenario, and repeats step ii until no segment crosses any of the polygons. In the example, the tangent segment SC is not visible because crosses the triangle obstacle 520. Thus, the triangle is considered as a new polygon to avoid in order to reach the C point. After step ii is applied between point S and the triangle, two new common tangents are obtained: SE and SF tangent segments.
iv) The new conflict-free segments are appended to the graph, in this case the SB, SE and SF segments. Once they are added, a priority value is assigned to each segment ending point (B, E and F) and ordered according to the minimum value of the metric. Such metric is computed in this example as the distance between the source S point and the points to be appended to the graph, plus the distance from the latter to the target T point assuming it is free of obstacles; it has to be noted that the latter distance (from the new points to T) does not have to be conflict free necessarily. Referring back to the example, point B has a metric associated of 10.206 (distance S-B+distance B-T); point F has a metric associated of 10.059 (distance S-F+distance F-T) and finally point E has a metric of 12.033 (distance S-B+distance B-T). Finally, by expanding from S, the S point from the LPWV is removed. Therefore, if we sort the new points according to the metric, the graph of LPW is as follows: ([10.059, F], [10.206, B], [12.033, E]).

On the FIG. 5C, the graph is expanded from the F node, which is the first point in the LPW. The heuristic distance associated to the F node represents that the path S→F→Target would be shorter than the path from B if there were no additional obstacles. Now we are to expand the graph from the F point following the same exact procedure we just used when expanding from S, which would be:
i) The FT segment is defined and checked whether it intersects any of the polygons in the scenario. In this case, the FT segment intersects the square obstacle 510.
ii) The common tangents are generated which give rise to the points C and B. As point B is already included in LPW it is ignored in this step because it is a longer path towards T through B than the one included in the previous graph expansion, so we'll stick to C in this expansion. That is to say, the length of the SFB path with the length of the SB path is compared. In this case, the most efficient path to reach the waypoint B is the SB path. Thus, the segment FB is not added to the graph.
iii) It is checked whether FC intersects another polygon, which it does not.
iv) The new conflict free segment is appended into the graph, in this case the metric associated to C is the distance S-F-C-T which gives 10.242. Again, since we are expanding from F, we remove F from the list of LPWV which stays as follows after this expansion: [10.206, B], [10.242, C], [12.033, E].

Figure 5F:
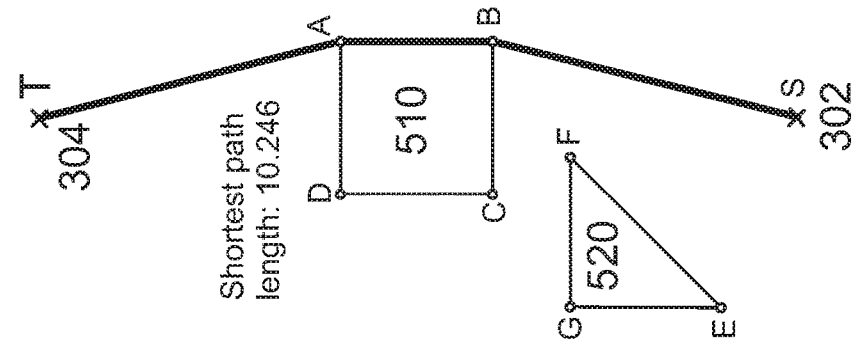
Figure 5E:
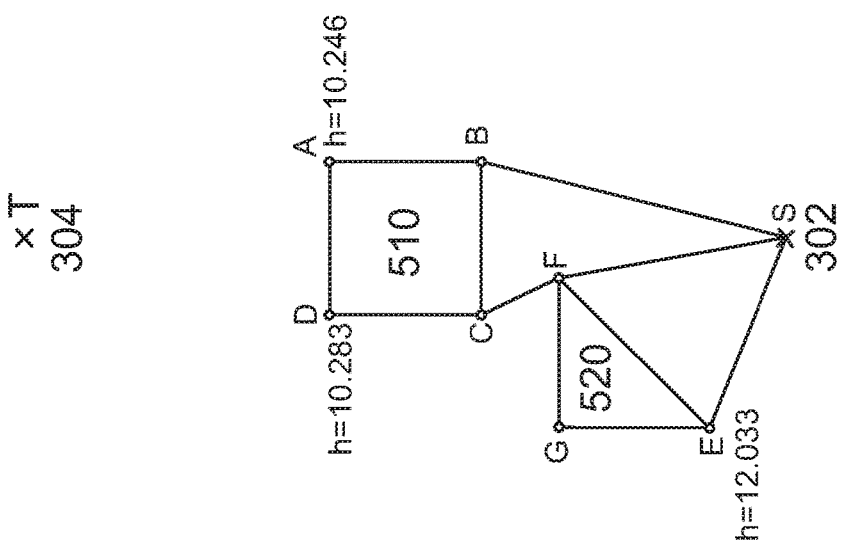
Figure 5D:
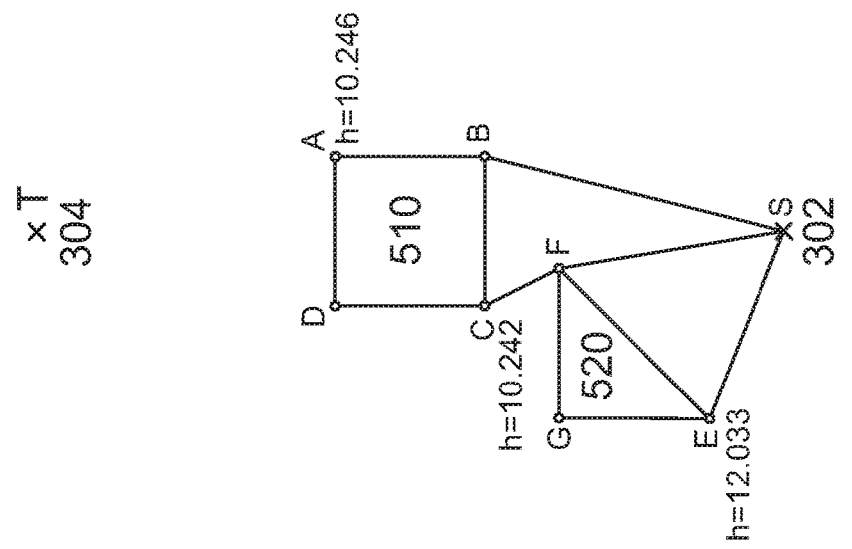

In FIG. 5D, the algorithm expands the graph from B because, according to the heuristic, is the shortest potential path and consequently, it is the first in the list. Again, the BT segment is defined and a new collision with the square obstacle 510 is found. To avoid the square obstacle 510 from B, its two common tangent segments (BC and BA) are defined. As in the previous cases, there is a more efficient path in the graph to reach the C point. Therefore, the BC segment is not added to the graph. Nevertheless, the BA segment must be added to the graph. The first point in LPW is deleted, it calculates the heuristic distance from A and finally, it adds the BA segment. At the end of the fourth step, the LPW is as follows: [10.242, C], [10.246, A], [12.033, E].

In FIG. 5E, the algorithm expand the graph from C, which is the first point in LPW. Following the explained logic, the segment CD is added to the graph and the calculation of the heuristic process provides the next list to continue with the expansion of the graph: [10.246, A], [10.283, D], [12.033, E].

The last step is shown in FIG. 5F. In such step, the algorithm expands the graph from the A point (first point in the LPWs). In this case, the segment AT is collision-free and reaches the target T point. Since the graph is always expanded from the "best-looking" node, the graph expansion can be stopped once the target T is reached.

The present teachings guarantee the resulting path (S→B→A→Target) can be obtained effortlessly by backtracking the path from the target, which simplifies the problem to a great extent.

Several relevant features presented herein significantly reduce the computation cost to find autonomous shortest lateral paths regarding existing solutions.

One of the preferred embodiments of the above teachings relates to a method to be implemented in a computer system including one or more processors. Another preferred embodiment relates to a system, like a navigation system or a guidance system to be implemented in an autonomous or semi-autonomous vehicle. Another preferred embodiment relates to computer program product that includes code instructions that, when executed by a processor, causes the processor to perform the methods described herein. In particular, automatically guiding a vehicle, like a UAV or a ground robot, from a source S to a target T within a scenario with obstacles.

The invention claimed is:

1. A computer-implemented method for guiding a vehicle from a source (S) to a target (T) within a scenario with obstacles, the method comprising:
   establishing the source (S) as a starting point (S');
   computing a subpath from the starting point (S') to the target (T);
   detecting if an obstacle (O) crosses the computed subpath;
   repeatedly, for a detected obstacle (O), computing a plurality of obstacle-free subpaths avoiding the detected obstacle (O), each obstacle-free subpath connecting the starting point (S') to a waypoint (W) of an outer boundary of a detected obstacle (O);
   computing a priority value for each waypoint (W), wherein the priority value is computed based on:
      the distance between the waypoint (W) and the target (T) regardless of eventual obstacles and
      the accumulated distance from the source to the waypoint (W), wherein accumulated distance comprises at least the distance between the starting point and the ending point of at least one computed obstacle-free subpath from the source to the waypoint (W), the distance being defined according to a pre-established metric;
   storing each waypoint (W) and its corresponding priority in a list of potential waypoints (LPW);
   selecting the highest priority waypoint (W) in the list as a starting point (S') and repeating the previous steps until the target (T) is reached;
   obtaining an optimal path by backtracking waypoints (W) from the target (T) to the source (S); and
   guiding the vehicle according to the optimal path.

2. The computer-implemented method of claim 1, wherein the outer boundary of an obstacle (O) is modelled by a geometrical figure.

3. The computer-implemented method of claim 2, wherein the waypoint (W) is obtained as an intersection of a common tangent segment to the geometrical figure corresponding to the obstacle (O).

4. The computer-implemented method of claim 3, wherein the waypoint is a vertex of a polygon.

5. The computer-implemented method of claim 1, wherein the metric is selected among the following: Euclidean, less fuel consumption, less altitude, Geodesic distance.

6. The computer-implemented method of claim 1, wherein the obstacle is represented by a no-incursion zone.

7. The computer-implemented method of claim 1, wherein the vehicle is selected among a UAV, an aircraft, a ground robot and an autonomous car.

8. A system for guiding a vehicle from a source (S) to a target (T) within a scenario with obstacles comprising:
   a path computing unit (10) configured to:
      establish the source (S) as a starting point (S');
      compute a subpath from the starting point (S') to the target (T);
   a detecting unit (20) configured to detect if an obstacle (O) crosses a computed subpath;
   the path computing unit (10) further configured to repeatedly compute a plurality of obstacle-free subpaths avoiding the detected obstacle (O), each obstacle-free subpath connecting the starting point (S') to a waypoint (W) of an outer boundary of an obstacle (O) detected in a computed path;
   a selecting unit (30) configured to:
      compute a priority value for each waypoint (W), wherein the priority value is computed based on the distance between the waypoint (W) and the target (T) regardless of eventual obstacles and the accumulated distance from the source to the waypoint (W), wherein accumulated distance comprises at least the distance between the starting point and the ending point of at least one generated obstacle-free path from the source to the waypoint (W), the distance being defined according to a pre-established metric;
      store each waypoint (W) and its corresponding priority in a list of potential waypoints (LPW) to check;
      select the highest priority waypoint (W) in the list as a starting point (S') and repeating the previous steps until the target (T) is reached;
   the path computing unit (10) further configured to:
      obtain an optimal path by backtracking waypoints (W) from the target (T) to the source (S); and
   a guiding unit (40) configured to guide the vehicle according to the optimal path.

9. The system of claim 8, wherein the outer boundary of an obstacle (O) is modelled by a geometrical figure.

10. The system of claim 9, wherein the waypoint (W) is obtained as an intersection of a common tangent segment to the geometrical figure corresponding to the obstacle (O).

11. The system of claim 10, wherein the waypoint is a vertex of a polygon.

12. The system of claim 8, wherein the metric is selected among the following: Euclidean, less fuel consumption, less altitude, Geodesic distance.

13. The system of claim 8, wherein the obstacle is represented by a no-incursion zone.

14. The system of claim 8, wherein the vehicle is selected among a UAV, an aircraft, a ground robot and an autonomous car.

15. A computer program product for guiding a vehicle from a source to a target within a scenario with obstacles comprising computer code instructions that, when executed by a processor, causes the processor to perform functions comprising:
   establishing the source (S) as a starting point (S');
   computing a subpath from the starting point (S') to the target (T);
   detecting if an obstacle (O) crosses the computed subpath;
   repeatedly, for a detected obstacle (O), computing a plurality of obstacle-free subpaths avoiding the detected obstacle (O), each obstacle-free subpath connecting the starting point (S') to a waypoint (W) of an outer boundary of a detected obstacle (O);
   computing a priority value for each waypoint (W), wherein the priority value is computed based on:
      the distance between the waypoint (W) and the target (T) regardless of eventual obstacles and
      the accumulated distance from the source to the waypoint (W), wherein accumulated distance comprises at least the distance between the starting point and the ending point of at least one computed obstacle-free subpath from the source to the waypoint (W), the distance being defined according to a pre-established metric;
   storing each waypoint (W) and its corresponding priority in a list of potential waypoints (LPW);
   selecting the highest priority waypoint (W) in the list as a starting point (S') and repeating the previous steps until the target (T) is reached;
   obtaining an optimal path by backtracking waypoints (W) from the target (T) to the source (S); and
   guiding the vehicle according to the optimal path.

16. The computer program product of claim 15, wherein the outer boundary of an obstacle (O) is modelled by a geometrical figure.

17. The computer program product of claim 16, wherein the waypoint (W) is obtained as an intersection of a common tangent segment to the geometrical figure corresponding to the obstacle (O).

18. The computer program product of claim 17, wherein the waypoint is a vertex of a polygon.

19. The computer program product of claim 15, wherein the metric is selected among the following: Euclidean, less fuel consumption, less altitude, Geodesic distance.

20. The computer program product of claim 15, wherein the obstacle is represented by a no-incursion zone.

* * * * *